United States Patent [19]
Lehmann

[11] 4,136,546
[45] Jan. 30, 1979

[54] PRESSURE ROLL

[75] Inventor: Rolf Lehmann, Rudolfstetten, Switzerland

[73] Assignee: Escher Wyss Limited, Zurich, Switzerland

[21] Appl. No.: 854,346

[22] Filed: Nov. 23, 1977

[30] Foreign Application Priority Data

Nov. 30, 1976 [CH] Switzerland ............ 015032/76

[51] Int. Cl.² ........................................ B21B 13/02
[52] U.S. Cl. ................................ 72/241; 29/116 AD
[58] Field of Search ............... 72/241, 242, 245, 366; 29/116 R, 116 AD, 129, 113 AD; 100/170

[56] References Cited

U.S. PATENT DOCUMENTS

| | | | |
|---|---|---|---|
| 1,665,136 | 4/1928 | Lauffer | 29/116 R |
| 2,053,375 | 9/1936 | Nicholas | 72/366 X |
| 3,286,325 | 11/1966 | Justus | 29/116 AD |
| 3,618,190 | 11/1971 | Vernazza et al. | 29/116 AD |
| 3,737,979 | 6/1973 | Rakich et al. | 72/366 X |
| 3,854,646 | 12/1974 | Dorfel et al. | 29/116 AD X |
| 4,048,701 | 9/1977 | Marchioro | 29/116 AD |
| 4,074,624 | 2/1978 | Biorastad et al. | 100/170 X |

FOREIGN PATENT DOCUMENTS 7208896  1/1973  Netherlands ............ 29/116 AD

*Primary Examiner*—Milton S. Mehr
*Attorney, Agent, or Firm*—Robert A. Ostmann

[57] ABSTRACT

Pressure roll having a stationary axial supporting member and having a roll shell rotatable about the supporting member, the said shell being supported by hydrostatic supporting elements; the roll shell is mounted to be mobile in all radial directions relatively to the supporting member, and is guided radially relatively to the supporting member only by means of the supporting elements and by means of at least one counter-roll appointed to the roll shell; the supporting elements are constructed to follow the radial movements of the roll shell.

10 Claims, 5 Drawing Figures

PRESSURE ROLL

BACKGROUND OF THE INVENTION

The invention relates to a pressure roll having a stationary axial supporting member and having a roll shell which can rotate about the supporting member and which is supported on the supporting member by hydrostatic supporting elements.

The pressure roll initially described is a so-called pressure equalisation roll. The shell is pressed by means of the supporting elements against at least one counter-roll appointed to the pressure rolls in a rolling mill, whereby an equal application pressure can be produced in all regions along the press gap between the co-operating rolls. The supporting elements are arranged in supporting planes each of which is defined by the axis of the supporting member or the roll shell respectively and the axis of the counter-roll. The press gap is also situated in each case in the supporting plane.

Deflection of the supporting member occurs during a pressure treatment on a web of material in the press gap under the action of the supporting elements. The roll shell is also subjected to deformation when it is adapted to deflection of the counter-roll under the pressure of the supporting elements to form a press gap of equal clearance over the entire width of the web of material.

In a three-high mill in which the axes of a pressure roll and of the counter-rolls are situated in two planes parallel to one another, the roll shell is to be adapted at the same time to the deflection of the two counter-rolls.

Since the position and shape of the roll shell and those of the supporting member continually vary relatively to one another during operation of the rolling mill, it is difficult to find a mounting for the roll shell relatively to the supporting member. Hitherto known constructions connected therewith are complicated and are not always satisfactory in all possible uses of a pressure equalisation roll. For example in the aforesaid three-high rolling mills: here the roll shell, if guided and mounted in a conventional manner relatively to the supporting member, cannot follow relatively deep deflections of the counter-rolls. This has the result that the counter-rolls also have to be constructed as pressure equalisation rolls in order to obtain a substantially straight press gap. This makes rolling mills of this kind correspondingly expensive and complicated.

SUMMARY OF THE INVENTION

The invention has as its object to provide a mounting for supporting the roll shell relatively to the supporting member for a pressure roll of the type initially specified which allows adaptation of the roll shell of the pressure roll to the deflection-subjected counter-rolls to a greater extent than hitherto.

According to the invention, this object is achieved in that the roll shell is mounted to be mobile relatively to the supporting member in all radial directions and is guided radially relatively to the supporting member only by means of the supporting elements and at least one counter-roll which is appointed to the roll shell, the supporting elements being constructed to follow radial movements of the roll shell.

The roll shell is freely mobile relatively to the supporting member in all radial directions and its position in space and its shape is determined in these directions exclusively by the co-operation of the supporting elements and at least one counter-roll. In a three-high rolling mill, a pressure equalisation roll of this kind can advantageously be used together with two simple integral rolls acting as counter-rolls. The roll shell follows the deflection of these counter-rolls. The construction of the pressure roll and of the entire rolling mill is simplified and its cost reduced.

BRIEF DESCRIPTION OF THE DRAWING

The subject of the invention will be explained hereinafter with reference to drawings in which some constructional examples of the pressure roll according to the present invention are shown in a simplified manner. In the drawings.

DESCRIPTION OF THE PREFERRED EMBODIMENTS

Figure 1:
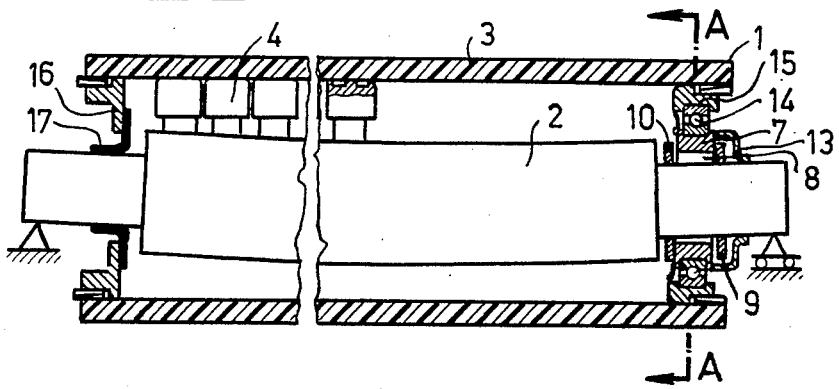
FIG. 1 shows a first constructional example in partial longitudinal section.

The pressure roll 1 is a pressure equalisation roll. It comprises a stationary i.e. non-rotatable supporting member 2 and a roll shell 3 is arranged to be capable of rotating about the said supporting member. The roll shell 3 is supported on the supporting member 2 by hydrostatic supporting elements 4 of which only a few are shown here in order to simplify the drawings. The supporting elements 4 are arranged in respective rows along the supporting member 2 and in a supporting plane E which is defined by the axis of the supporting member 2, or the roll shell 3 of the pressure roll 1, and the axis of a counter-roll 5. If two counter-rolls $5^1$ and $5^2$ are associated with a pressure roll 1 to constitute a three-high rolling mill, two supporting planes $E^1$ and $E^2$ result in each of which supporting elements $4^1$ and $4^2$ are arranged in rows along the supporting member 2. In each supporting plane E the press gap 6 is also situated between the roll shell 4 of the pressure roll 1 and the counter-roll 5.

The supporting member 2 of the pressure roll 1 is supported in a stand not shown here in which at least one counter-roll 5 is also mounted. The supporting member 2 is mounted to be non-rotatable in the stand. Since, however, it is subjected to deflection during operation under the action of the supporting elements 4 bearing on it, it is mounted to be axially nondisplaceable at one end but axially displaceable at the other end. The arrangement for supporting the supporting member 2 in the stand is shown in a diagrammatic manner in FIG. 1 at the two ends of the supporting member 2.

Figure 5:
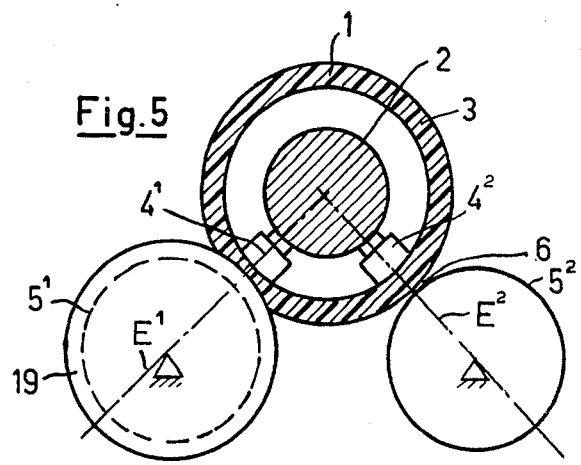
FIG. 5 shows a three-high rolling mill in partial cross-section.

The roll shell 3 arranged to be rotatable about the supporting member 2 is mounted to be mobile in all radial directions relatively to be supporting member 2. It is not connected to and guided by the supporting member in any radial direction. Its position in space is guided radially relatively to the supporting member only by means of the supporting elements 4 and at least one counter-roll 5 which is associated with it in the rolling mill. If the roll shell 3, such as that shown in FIG. 5, is associated with two counter-rolls $5^1$ and $5^2$, its position radially relatively to the supporting member 2 is defined only by the two counter-rolls $5^1$ and $5^2$ and by the co-operating two rows of supporting elements $4^1$ and $4^2$. Thus the roll shell 3 follows the geometric variations of the counter-rolls, the deflection of these rolls, under the pressure of the supporting elements $4^1$ and $4^2$, without being hindered by the supporting member 2. The hydrostatic supporting elements 4 are so constructed that in the supporting plane E they can follow the movements of the roll shell 3 radially with respect to the supporting member 2. Their actual construction for this purpose is already known in the case of pressure equalisation rolls. They are each capable of hydraulic displacement in the supporting plane E. They can also swing relatively to the plane E. Radial movement of the roll shell 3, its deformation or its displacement on the one hand is provided by the action of the supporting elements 4 supported in the supporting member, and on the other hand limited by the counter-rolls 5.

Figure 2:
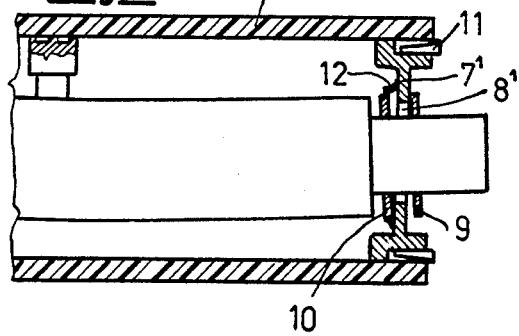
FIG. 2 shows a second constructional example.
Figure 4:
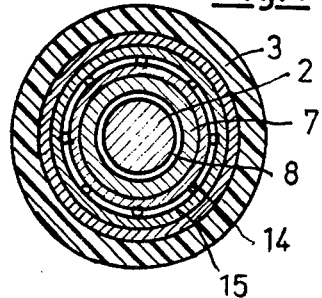
FIG. 4 shows a section taken on the line A—A of FIG. 1.

As FIGS. 1 and 2 show particularly, the roll shell 3 is mounted to be movable in all radial directions with respect to the supporting member 2, but is guided in the axial direction relatively to the supporting member 2 on the supporting member 2 itself. The guiding of the roll shell 3 on the supporting member 2 is ensured only at one region of the roll shell or supporting member. Longitudinal modifications of the roll shell 3 relatively to the supporting member 2 during operation can thus be allowed to take place unhindered. Also the pressure roll 1 comprises a guide ring 7 surrounding the supporting member 2 and arranged between the roll shell 3 and the supporting member 2, coaxially relatively to the roll shell, the said ring comprising a central aperture 8 which allows the guide ring 7 to move in all radial directions relatively to the supporting member 2. Preferably this is so constructed in the constructional example that the supporting member 2 at the region where the guide ring 7 is to be arranged comprises a round configuration and the central aperture 8 of the guide ring 7 has a larger diameter than the supporting member 2 at that region. The guide ring 7 is associated with the roll shell 3 in such a manner as to be incapable of displacement radially and axially, but is guided on the supporting member 2 between two boundary rings 9 and 10 which are both connected securely to the supporting member 2.

As is shown in FIG. 2, the guide ring which is designated as $7^1$ is secured relatively to the roll shell 3 by means of wedges 11 and is capable of being rotated together with the roll shell 3. A sealing ring 12 is provided between the boundary ring 10 and the guide ring $7^1$.

In the constructional example shown in FIG. 1 the guide ring 7 is arrested in the direction of rotation of the roll shell 3. It does not rotate with the roll shell. For this purpose there is provided an elastomeric sleeve 13 which is secured on the one hand relatively to the guide ring 7 and on the other hand relatively to the supporting member 2. This sleeve holds the guide ring 7 in the rotation direction of the roll shell 3 but allows radial movements of the guide ring 7 with respect to the supporting member 2. Between the non-rotatable guide ring 7 and the rotatable roll shell 3 there is provided a bearing 14 which is not capable of radial and axial displacement and whose external ring 15 is secured with respect to the roll shell 3. The bearing 14 which is used comprises a ball bearing which does not allow swinging movements between the external and internal rings of the bearing. Since the guide ring 7 with the roll shell 3 is at an inclination relatively to the supporting member when there is deflection of the supporting member 2 during operation, as is shown in an exaggerated form in FIGS. 1, 2 and 3, the two boundary rings 9 and 10 are arranged with a certain amount of play with respect to the guide ring 7 or $7^1$ respectively to allow tolerances in the inclined position of the guide ring 7 relatively to the supporting member 2.

Figure 3:
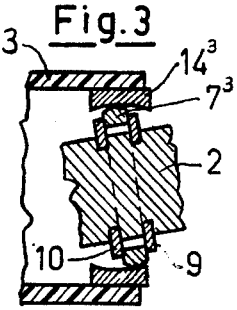
FIG. 3 shows a detail of a spherical bearing arrangement.

If, as FIG. 3 shows particularly, the bearing $14^3$ between the guide ring $7^3$ and the roll shell 3 is of spherical form, for example a self-aligning roller bearing or a spherical barrel roller bearing, the guide ring $7^3$ can take up an inclined position with respect to the roll shell 3 and the boundary rings 9 and 10 abut closely on the guide ring. Such axial guiding of the roll shell 3 with respect to the supporting member 2 produces very little noise.

To adapt the roll shell 3 to the deflection of the counter-roll 5 which occurs during operation, that is to say to change the shape of the generatrix lines (when the counter-rolls are not subjected to deflection) to curves (when the counter-rolls are subjected to deflection) besides the pressure force with which the web of material is treated in the press gap 6 a shape-changing force is also to be exerted by the supporting elements 4. It is possible to economise in this additional force to a considerable extent if the roll shell 3 is made elastic as in the constructional examples. For this purpose the roll shell 3 is made at least partly of an elastomeric material. An elastic roll shell made from thin steel tube is advantageous for the same reason.

As FIG. 1 shows clearly, the roll shell 3 is guided relatively to the supporting member 2 in the axial direction only at one region of the roll shell 3 or supporting member 2, and in fact the only axial guide device is shown at the right in FIG. 1. At the opposite end of the pressure roll 1, at the left in FIG. 1, there is provided only a sealing device which comprises a sealing ring 16, the said ring abutting in sealing-tight manner on the roll shell 3 and being capable of rotating together with the said shell, and which comprises an elastomeric sealing sleeve 17 which is secured in sealing-tight manner relatively to the supporting member 2 on the one hand and fitting slideably against the sealing ring 16 on the other hand. A third constructional form of the pressure roll 1 is shown in FIG. 5. Here, the roll shell 3 is guided relatively to the supporting member 2 in the axial direction by a counter-roll $5^1$ co-operating with the pressure roll 1 in the rolling mill. This counter-roll $5^1$ comprises at both ends a flange ring 19 secured on the edge of the shell of this counter-roll. Only the front flange ring is shown in the drawings. The axial spacing between the two flange rings 19 is adapted to the length of the roll shell 3 of the pressure roll 1, so that the roll shell 3 is guided in the axial direction relatively to the supporting member 2 by the two flange rings 19. The shell of the counter-roll $5^1$ with the two flange rings 19 is guided axially and radially by way of the bearing of the shaft of the counter-roll $5^1$ in the stand of the rolling mill. It would be possible to arrange a first flange ring for guiding the roll shell 3 on the first counter-roll $5^1$ and a second flange ring for guiding the roll shell 3 at the other side on the second counter-roll $5^2$.

The pressure roll 1 in this example shown in FIG. 5 is very simple. The arrangement dispenses completely with any axial guiding device between the roll shell 3 and the supporting member 2. The interior of the roll shell is sealed relatively to the exterior in an advantageous manner in the way described in connection with FIG. 1 and as is shown at the left in FIG. 1.

The pressure roll 1 according to the present invention can additionally be provided with some important features which in general are already known in pressure equalisation rolls. Thus it would be possible to form the supporting elements 4 in a plurality of zones along the press gap 6, the supporting elements associated with one zone being connected to a separate pressure conduit. In this way it is possible to operate the individual zones of supporting elements along the width of the web of material being treated with different pressures.

To simplify the lifting of the pressure roll 1 away from the counter-rolls 5, it would be possible to provide at least one hydrostatic pressure element on the supporting member 2. By means of pressure in the pressure element and at the same time shutting off the pressure in the supporting elements 4, the roll shell 3 could then be lifted away from the counter-rolls 5. The pressure roll can also be used in a two-roll stand with a single counter-roll. If, under unfavourable operating conditions, swinging movements of the roll shell of the pressure roll relatively to the supporting plane should occur, one or two simple guide rolls should be associated with the roll shell in order to correct its running.

I claim:
1. A roll unit including
   a. a pressure equalization roll and at least one counter-roll which coacts with the equalization roll to define a press gap,
   b. the equalization roll comprising a stationary axial supporting member, a series of hydrostatic supporting elements mounted in the supporting member and arranged in a row which extends along the press gap, and a shell which rotates about the supporting member and is supported thereon via the hydrostatic supporting elements,
   c. the shell being free to move in all radial directions relatively to the supporting member, and the supporting elements being radially displaceable so that they follow radial movements of the shell,
   d. the equalization roll also including at least one guide ring which surrounds the supporting member and is interposed between that member and the shell, said ring containing a central aperture dimensioned to permit the ring to move in all radial directions relatively to the supporting member;
   e. means restraining the guide ring against axial movement relatively to the supporting member; and
   f. means restraining the guide ring against both radial and axial movement relatively to the shell,
   g. whereby the shell is guided radially solely by the supporting elements and the counter-roll, and is guided axially by the supporting member via the guide ring.

2. A roll unit as defined in claim 1 which includes only one guide ring; and the shell is guided axially solely by that guide ring.

3. A roll unit as defined in claim 1 in which said guide ring is fixed to the shell so that these two parts rotate together.

4. A roll unit as defined in claim 1 including means restraining the guide ring against rotation relatively to the supporting member; and a bearing which is interposed between the guide ring and the shell and is fixed against both axial and radial movement with respect to these parts.

5. A roll unit as defined in claim 4 in which said bearing is of the self-aligning type having cooperating bearing portions which can move relatively to each other so as to accommodate tilting of the supporting member relatively to the shell.

6. A roll unit as defined in claim 4 in which said means which restrains the guide ring against rotation relatively to the supporting member comprises an elastomeric sleeve which is attached to said ring and member.

7. A roll unit as defined in claim 1 in which the shell is made at least partially of an elastomeric material and is thereby elastic.

8. A roll unit as defined in claim 1 in which the shell is made from thin steel tubing and is thereby elastic.

9. A roll unit including
   a. a pressure equalization roll and at least one counter-roll which coacts with the equalization roll to define a press gap,
   b. the equalization roll comprising a stationary axial supporting member, a series of hydrostatic supporting elements mounted in the supporting member and arranged in a row which extends along the press gap, and a shell which rotates about the supporting member and is supported thereon via the hydrostatic supporting elements,
   c. the shell being free to move axially and in all radial directions relatively to the supporting member, and the supporting elements being radially displaceable so that they follow radial movements of the shell,
   d. whereby the shell is guided radially solely by the supporting elements and the counter-roll; and
   e. the counter-roll is guided axially and includes an annular flange which coacts with an end of the shell to thereby provide axial guiding for the shell in one axial direction.

10. A roll unit as defined in claim 9 in which the counter-roll includes a second annular flange which coacts with the opposite end of the shell to thereby provide axial guiding for the shell in the opposite axial direction, the shell being guided axially solely by said flanges.

* * * * *